(12) United States Patent
Nelson

(10) Patent No.: US 8,301,311 B2
(45) Date of Patent: Oct. 30, 2012

(54) FREQUENCY-RESPONSIVE WIND TURBINE OUTPUT CONTROL

(75) Inventor: Robert J. Nelson, Orlando, FL (US)

(73) Assignee: Siemens Aktiengesellschaft, Munich (DE)

( * ) Notice: Subject to any disclaimer, the term of this patent is extended or adjusted under 35 U.S.C. 154(b) by 785 days.

(21) Appl. No.: 12/497,772

(22) Filed: Jul. 6, 2009

(65) Prior Publication Data

US 2011/0001318 A1 Jan. 6, 2011

(51) Int. Cl.
*H02P 9/04* (2006.01)
*G05D 17/00* (2006.01)
(52) U.S. Cl. ............................. 700/287; 290/44; 290/55
(58) Field of Classification Search .................. 700/287; 290/44, 55
See application file for complete search history.

(56) References Cited

U.S. PATENT DOCUMENTS

| | | | |
|---|---|---|---|
| 5,083,039 A | 1/1992 | Richardson | |
| 5,225,712 A | 7/1993 | Erdman | |
| 7,002,260 B2 * | 2/2006 | Stahlkopf | 290/44 |
| 7,345,373 B2 | 3/2008 | Delmerico | |
| 7,372,173 B2 | 5/2008 | Lutze et al. | |
| 2005/0077881 A1 | 4/2005 | Capp et al. | |
| 2008/0088131 A1 | 4/2008 | Thisted | |
| 2011/0012352 A1 * | 1/2011 | Nelson et al. | 290/44 |
| 2011/0153099 A1 * | 6/2011 | Garcia | 700/287 |

FOREIGN PATENT DOCUMENTS

| | | |
|---|---|---|
| EP | 1467463 A1 | 10/2004 |
| EP | 2072813 A2 | 6/2009 |
| EP | 2075463 A2 | 7/2009 |
| EP | 2270332 A1 | 1/2011 |
| WO | WO 03/023224 A1 | 3/2003 |
| WO | 2010108910 A2 | 9/2010 |
| WO | 2011000531 A2 | 1/2011 |

OTHER PUBLICATIONS

Mauricio, Marano, Gomez-Exposito, Martinez Ramos; "Frequency Regulation Contribution Through Variable-Speed Wind Energy Conversion Systems"; IEEE Transactions on Power Systems; Feb. 2009; pp. 173-180; vol. 24, No. 1.
Wan; "A Primer on Wind Power for Utility Applications"; NREL National Renewable Energy Laboratory; Dec. 2005; 44 pages; Technical Report NREL/TP-500-36230.
Holst, et al. In VDI/VDE: 6. GMA/ETG-Fachtagung "Sichere Und Zuverlassige Systemfuhrung Von Kraftwerk Und Netz Im Zeichen Der Deregulierung", May 21, 2003 (pp. 1-15).
English translation of #1 above: Holst et al; VDI/VDE: 6th GMA/ETG-Conference "Safe and Reliable System Control for Power Plant and Grid in the Era of Deregulation," May 21-22, 2003, Munich; Grid Control Behavior of Wind Power Plants; May 21-22, 2003; pp. 1-19; XP002473464; Munich, Germany.
Prillwitz, et al. In ETG-Workshop "Neue Dezentrale Versorgungsstrukturen", Feb. 19-20, 2003 (pp. 1-6).
English translation of #3 above: Prillwitz et al.; "Primary Control with Wind Turbines"; ETG Workshop New Decentralized Supply Structures; Feb. 19-20, 2003; pp. 1-10; XP002473463; Frankfurt, Germany.

* cited by examiner

*Primary Examiner* — Ryan Jarrett

(57) ABSTRACT

A wind farm (10) may include a plurality of variable speed wind turbines (12, 14, 16). A centralized controller (50) may be configured to selectively adjust a respective electrical output power from each of the wind turbines. The controller may include a monitor (52) configured to monitor a correlation between a deviation from a grid frequency and a wind power change. The controller may be configured to adjust a response of the electrical output power based on the monitored correlation. The electrical output power response may be configured to meet a grid frequency regulation notwithstanding of random occurrences of wind power changes.

26 Claims, 3 Drawing Sheets

FREQUENCY-RESPONSIVE WIND TURBINE OUTPUT CONTROL

FIELD OF THE INVENTION

The present invention is generally related to wind turbines, and, more particularly, to wind turbine controller and/or control techniques conducive to meet grid frequency regulation requirements notwithstanding of random occurrences of wind power changes.

BACKGROUND OF THE INVENTION

On alternating current (ac) power systems, frequency is regulated by maintaining a balance between power generation and power consumption. When generation exceeds consumption for example, the surplus energy is converted to shaft kinetic energy of synchronous turbine generators that are on line, increasing their rotational speed and, hence, the system frequency. Similarly, when consumption exceeds generation, shaft kinetic energy is extracted from system turbine generators and converted to electric power, thereby reducing shaft speed and frequency. Since consumption is generally uncontrollable, frequency is controlled by adjusting generation output to balance demand. Different parts of the world have different rules dictating how this balancing is performed. In most of North America, for example, frequency regulation of electric power utilities is performed in accordance with control performance standards established by North American Electrical Reliability Corporation (NERC). Compliance with such frequency regulation standards is presently measured with parameters, such as Control Performance Standards 1 and 2 (CPS1 and CPS2).

For example, CPS1 is a statistical measure of the Area Control Error and its relationship to frequency error. The Area Control Error (ACE) represents the difference between the actual power interchange and the scheduled interchange, adjusted by a frequency correction. In the aggregate, it represents the difference between actual generation plus external purchases and scheduled generation, which is based on expected demand. Acceptable CPS1 scores can be attained as long as generation operates in a manner to support frequency, i.e., reducing generation output when frequency is above the nominal value (60.0000 Hz in North America) and reducing generation when frequency is low. Wind turbines do not normally operate in this manner. Instead of responding to frequency, wind turbine outputs respond to wind characteristics. At any given time, there is roughly a 50% likelihood that wind power variations will operate in a manner to exacerbate frequency variations. Consequently, it has been observed that increasing proliferation of wind results in declining performance on the NERC CPS1, e.g., in ERCOT (the Electric Reliability Council of Texas), which has observed declining performance on CPS1 as wind penetration levels have increase. Another performance standard is CPS2, which is a statistical measure of unacceptably high or low net generation. Some regions (e.g., Montana) have observed declining CPS2 performance resulting from increased wind penetration levels and resulting high variations in actual power generation compared with scheduled generation. These results are as expected because variations in wind power do not correlate at all with changes in electrical system frequency. Available wind power and system frequency are independent.

Consequently, unlike fossil-based generation, which is generally responsive to system frequency and/or load demands, the randomness of wind power is likely to result in scores that on the average would result on penalties about half of the time. It is possible that any monetary penalties associated with failure to comply with the applicable frequency regulation standards may be substantial and such penalties may be passed on to wind farm owners if it can be shown that non-compliance of frequency regulation results from an inability to appropriately control the output power from the wind turbines. In any event, it is clear that wind turbines do not presently act in a manner to support system frequency on a continuous basis.

It will be appreciated that, although the issues above have been described in the context of an example North American-based frequency regulation standard, the underlying issues apply world-wide to any wind turbine since the random nature of wind knows of no geopolitical boundaries and the methods of frequency control used in the rest of the world are similar to those used in the US and Canada. Therefore there is a need to overcome the above-mentioned issues and to provide apparatus and control techniques conducive to improvements in connection with frequency regulation for wind-driven power generation systems.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements and/or techniques conducive to improvements in connection with frequency regulation of wind-driven power generation systems are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Moreover, repeated usage of the phrase "in one embodiment"

does not necessarily refer to the same embodiment, although it may. Lastly, the terms "comprising", "including", "having", and the like, as used in the present application, are intended to be synonymous unless otherwise indicated.

Figure 1:
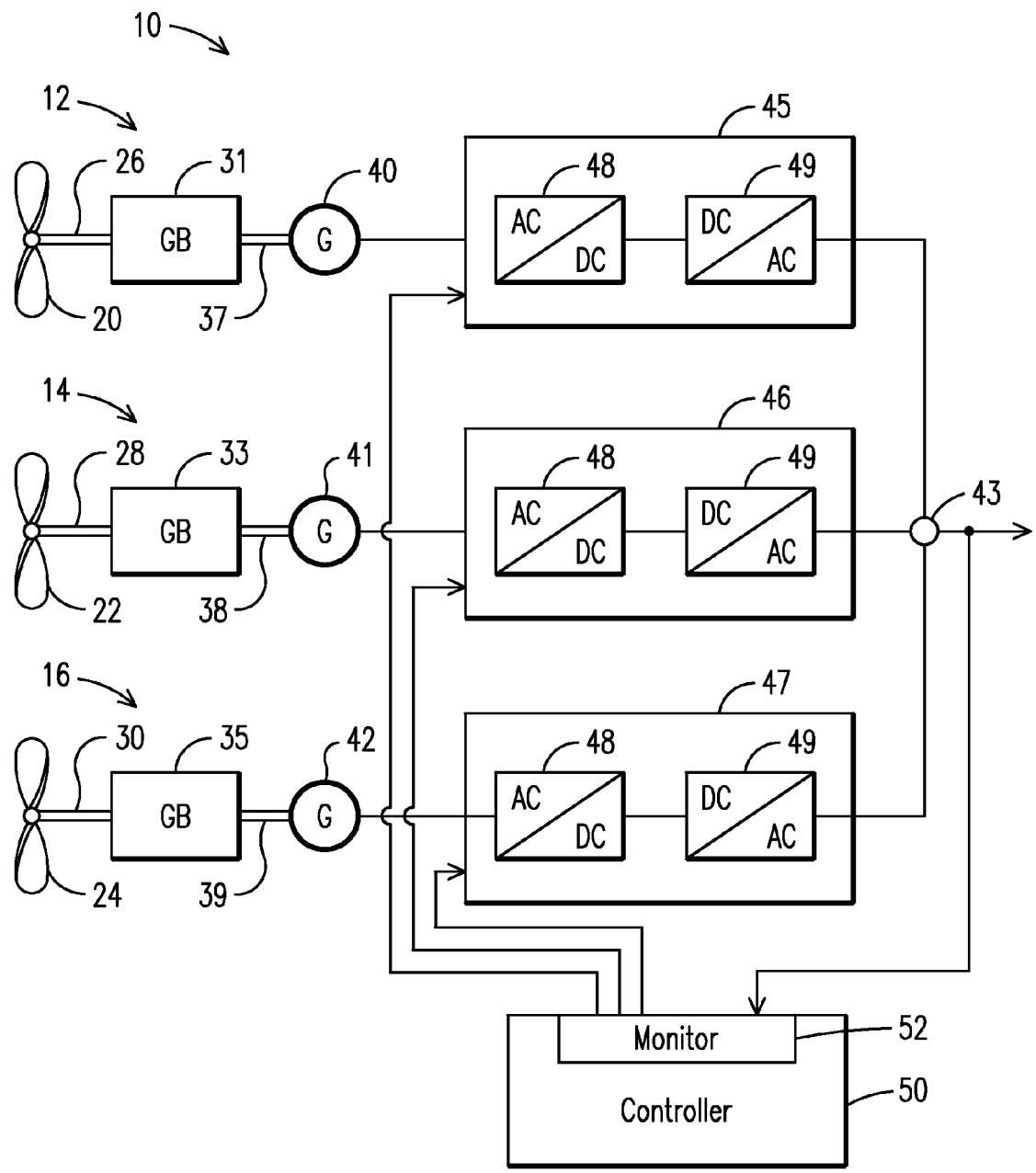
FIG. 1 is a schematic of an example embodiment of a power generation system, (e.g., a wind farm) that can benefit from aspects of the present invention.

FIG. 1 is a schematic of an example embodiment of a power generation system, such as a wind farm 10 that may benefit from aspects of the present invention. In this example embodiment, wind farm 10 comprises three wind turbine systems 12, 14, 16 (hereinafter referred to as wind turbines) which are coupled to respective generators and associated power converting electronics in an example interconnecting arrangement. It will be appreciated that the number of wind turbines is not limited in any way to three wind turbines. Additionally, aspects of the present invention are not limited to the specific example of wind turbine implementation shown in FIG. 1 being that other kinds of implementations are possible for the wind turbines. For example, DFIG (Doubly-fed Induction Generator) and DD (direct-drive) wind turbine implementations, in addition to the geared full-converter implementation shown FIG. 1, can similarly benefit from aspects of the present invention. Moreover, aspects of the present invention are not limited to wind turbines located in any particular region and can apply on world-wide basis.

Each wind turbine 12, 14, 16 comprises a respective rotor 20, 22, 24 with a rotor shaft 26, 28, 30 transmitting the torque of a turning rotor 20, 22, 24 to a respective gear box (GB) 31, 33, 35. The gear boxes (GB) 31, 33, 35 are arranged to transmit rotation from rotors 20, 22, 24 to output shafts 37, 38, 39 with a certain gear ratio.

Each output shaft 37, 38, 39 is mechanically coupled to the respective rotor of an AC (alternating current) generator (G) 40, 41, 42 which respectively transforms the mechanical power provided by the rotation of the output shafts 37, 38, 39 into electrical power. By way of example, the AC generators may be synchronous generators. In a synchronous generator, the rotor rotates with the same rotational frequency as the rotating magnetic field produced by the stator of the generator or with an integer relationship with the frequency of the rotating magnetic field, depending on the number of poles present in the rotor. The generators 40, 41, 42 are variable speed generators, i.e., the rotational speed of the respective rotors is allowed to vary, for example, depending on wind conditions.

Each wind turbine may be electrically connected to a node 43 to supply output power via respective power converter electronics 45, 46, 47 which respectively convert the variable frequency of the electrical power signals delivered by the generators 40, 41, 42 into electrical power output configured to meet a fixed grid frequency (e.g., 60 Hz in North America, 50 Hz in Europe). The respective frequencies of the power signals delivered by synchronous generators 40, 41, 42 vary depending on the respective rotational frequencies (e.g., revolutions per minute RPM) of the wind turbines rotors 20, 22, 24. However, by first rectifying (by means of respective rectifying circuits 48) the AC power delivered by generators 40, 41, 42 into DC power and then converting (by means of respective converting circuits 49) the DC power back into AC power, the respective generator variable frequencies can be converted to the grid frequency.

Wind farm 10 further comprises a centralized controller 50 communicatively coupled to each of the wind turbines 12, 14, 16 and configured to control the respective output power from the wind turbines in accordance with aspects of the present invention. It will be appreciated that the location of centralized controller 50 may be within the wind farm or remote from the wind farm. Additionally, the coupling connection between centralized controller 50 and wind turbines 12, 14, 16 may be effected by any suitable communication link, e.g., wired or wireless communication link. It will be appreciated that wind turbines 12, 14, 16 could be spread out over a relatively large wind farm area, and thus, the wind conditions that each wind turbine can experience over a given period of time need not be the same for each turbine. Accordingly, each wind turbine is individually controlled based on the respective conditions applicable to a given wind turbine.

The inventor of the present invention proposes innovative control techniques configured to control variable speed wind turbines so that changes in output power (due to wind power changes) that could lead to non-compliance of frequency regulation requirements can be appropriately adjusted (e.g., delayed or gradually effected) to reduce or avoid the potential negative effects on frequency regulation of such output power changes. For example, a rising output power change (e.g., due to increased wind power) can be delayed or slowly ramped up during periods of overfrequency ($+\Delta f$). Similarly, a decreasing output power change (due to decreased wind power) can be delayed or slowly ramped down during periods of underfrequency ($-\Delta f$).

Conversely, changes in output power conducive to compliance with frequency regulation requirements can be effected immediately (or per applicable local rules), as opposed to being delayed or gradually effected. For example, a rising output power (e.g., due to increased wind power) can be rapidly ramped up during periods of underfrequency ($-\Delta f$). Similarly, a decreasing output power (due to decreased wind power) can be rapidly ramped down during periods of overfrequency ($+\Delta f$).

As described in greater detail below, controller 50 may be configured to adjust the respective electrical output power from wind turbines 12, 14, 16. In one example embodiment, controller 50 includes a monitor 52 configured to monitor a correlation between a deviation from a grid frequency and wind power changes. By way of example, wind power changes in full-converter turbines can be detected by monitoring the shaft speed. Increasing shaft speed corresponds to increased energy production and decreasing shaft speed corresponds to decreased energy production. The controller is configured to adjust a response of the electrical output power based on the monitored correlation. The adjusted output power response is configured to meet a grid frequency regulation notwithstanding of random occurrences of wind power changes.

Figure 2:
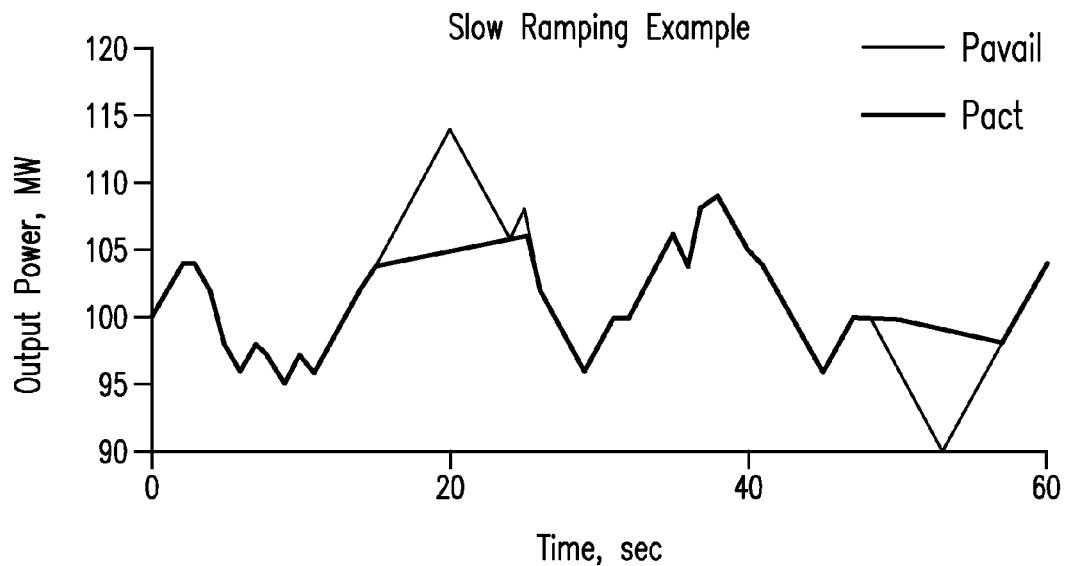
FIG. 2 shows respective plots over a period of time of available electrical output power and actual electrical output power from a wind turbine, which, in accordance with aspects of the present invention, is dynamically controlled in accordance with one example control strategy to facilitate meeting the applicable frequency regulation requirements.

FIG. 2 shows respective plots over a period of time of available electrical output power (Pavail) and actual electrical output power (Pact) of an example wind farm, which, in accordance with aspects of the present invention, is dynamically controlled to facilitate meeting any applicable frequency regulation requirements. For the sake of illustration the wind farm may be a 120 MW wind farm having a ramp rate of 10% of rated power per minute. In this example, available electrical output power represents available electrical output power based on the prevailing operational conditions, e.g., wind conditions, etc., and actual electrical output power represents actual electrical output power as controlled with a controller embodying aspects of the present invention.

Figure 3:
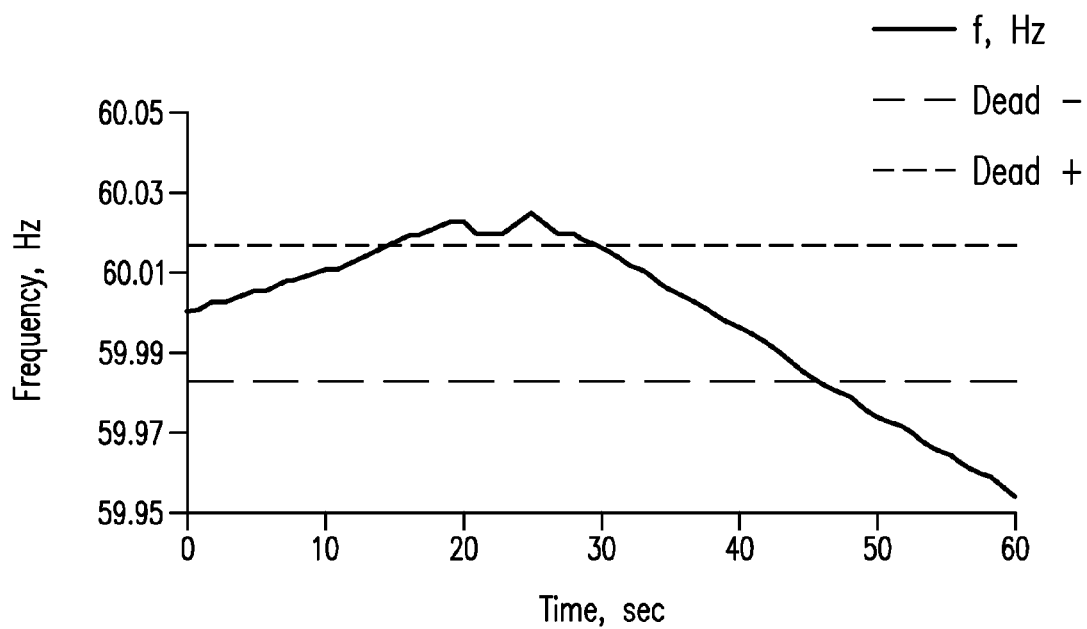
FIG. 3 is a plot of an example of frequency deviations over the same period of time shown in FIG. 2.

FIG. 3 is a plot of frequency variation over the same period of time shown in FIG. 2. This example presumes that control actions embodying aspects of the present invention are performed when the frequency values are outside predefined deadband values (Dead+ or Dead−).

In a first example scenario, such as from t=1 to t=14 sec, the frequency values are inside the deadband values Dead+ and Dead−, and, thus, no control action is provided and Pact=Pavail.

In a second example scenario, such as from t=15 sec to t=29 sec, the frequency values are above the deadband value Dead+, (over-generation condition) and thus during periods of increasing available output power, (e.g., from t=15 sec to t=22 sec) the actual power is controlled to increase at a relatively slow rate (e.g., 10% per minute or 0.2 MW/sec). This allows reducing or avoiding the potential negative effects on frequency regulation of such increasing available output power during the over-generation condition. Conversely, during periods of decreasing available output power, (e.g., from t=23 sec to t=29 sec) the actual power decreases without limitation. That is, changes in the available output power conducive to compliance with frequency regulation requirements are effected essentially immediately (or per applicable local rules).

In a third example scenario, such as from t=30 sec to t=45 sec, the frequency values one again are inside the deadband values, and thus Pact=Pavail.

In a fourth example scenario, such as from t=46 sec to t=60 sec, the frequency values fall below the deadband value Dead−, (under-generation condition) and thus during periods of decreasing available output power, (e.g., from t=46 sec to t=54 sec) the actual power is controlled to decrease at the relatively slow rate (e.g., 0.2 MW/sec). This allows reducing or avoiding the potential negative effects on frequency regulation of such decreasing available output power during the under-generation condition. Conversely, during periods of increasing available output power, (e.g., from t=54 sec to t=60 sec) the actual power is controlled to increase without limitation. That is, changes in the available output power conducive to compliance with frequency regulation requirements are effected essentially immediately (or per applicable local rules). As will be appreciated by those skilled in the art, wind turbines are capable of providing essentially an instantaneous output power response and thus in a practical implementation it may be desirable that the response has a certain rate limit during the fast transitions conducive to compliance with frequency regulation requirements, such as transitioning the output power at an average rate of 1% or more per second with respect to a rated output power of the wind turbine.

The foregoing output power control strategy is based on the two types of correlation between frequency deviation and wind power changes that can affect frequency regulation. For example, a positive correlation between Δf and wind power (both Δf and wind power level move in the same direction, i.e., Δf is positive and the wind power change is also positive or Δf is negative and the wind power change is also negative) means the available wind power would aggravate compliance with the frequency regulation requirements and thus a relatively slow ramping rate (or delay) is desirable when this type of positive correlation is established. Conversely, a negative correlation between Δf and wind power (both Δf and the wind power move in opposite directions i.e., Δf is positive and the wind power change is negative or Δf is negative and the wind power change is positive) means the available wind power would facilitate compliance with the frequency regulation requirements and thus a relatively fast ramping rate is desirable when this type of negative correlation is established.

Accordingly, the electrical power output of the wind turbine may be transitioned at a first rate of change (e.g., ramped up (or down) relatively slowly), when the available wind power would aggravate compliance with the frequency regulation requirements. In one example embodiment, the first rate of change may be a rate of 50% or less per minute with respect to a rated output power of the wind turbine. Conversely, when the available wind power would facilitate compliance with the frequency regulation requirements, the power output of the wind turbine is transitioned at a second rate of change higher than the first rate of change. In one example embodiment, the second rate of change may be an average rate of 1% or more per second with respect to a rated output power of the wind turbine.

Figure 4:
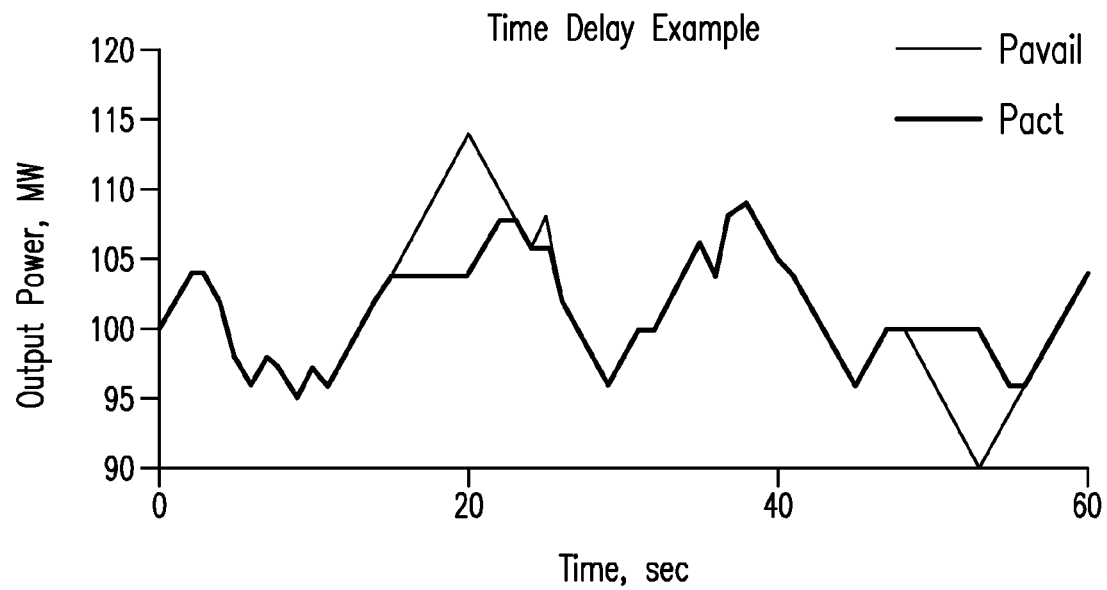
FIG. 4 shows respective plots over a period of time of available electrical output power (Pavail) and actual electrical output power (Pact) controlled in accordance with another example control strategy.
Figure 5:
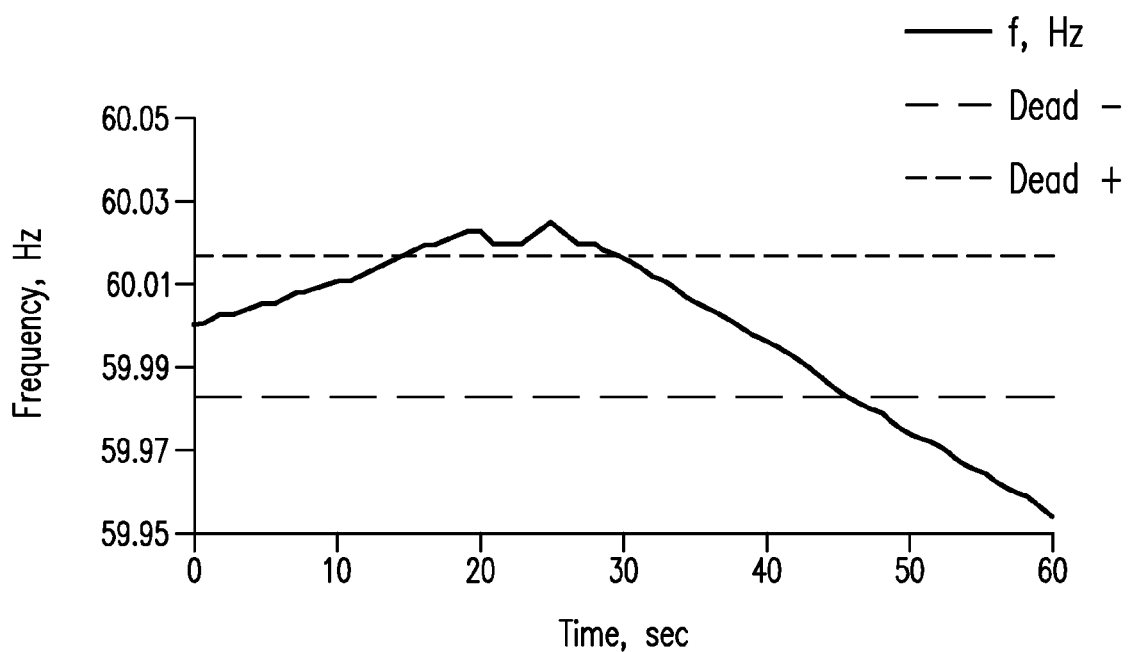
FIG. 5 is a plot of an example of frequency deviations over the same period of time shown in FIG. 4.

In an alternative control strategy, the rising (or decreasing) output power may be delayed by a time delay, which could typically range from 3 seconds to several minutes or more, in lieu of the relatively slow ramping up (or down) for the output power. FIG. 4 shows respective plots over a period of time of available electrical output power (Pavail) and actual electrical output power (Pact) of an example wind farm in accordance with this alternative control strategy. FIG. 5 is a plot of frequency variation over the same period of time shown in FIG. 4. It is noted that the frequency variation shown in FIG. 5 mimics the frequency variation shown in FIG. 3, and FIG. 5 is juxtaposed beneath FIG. 4 to visually facilitate observing the control actions shown in FIG. 4 relative to the illustrated sample frequency variation.

In the example shown in FIG. 5, the rising (or decreasing) output power is delayed by an example time delay of five seconds. For example, during an over generation condition, instead of allowing Pact to immediately respond to the increasing Pavail, Pact is delayed by 5 sec (e.g., from t=17 sec to t=20 sec) to reduce the negative effects on frequency regulation of such increasing available output power during the over-generation condition. Similarly, during the under-generation condition, instead of allowing Pact to immediately respond to the decreasing Pavail, Pact is delayed for 5 sec (e.g., t=48 sec to t=53 sec) to reduce the negative effects on frequency regulation of such decreasing available output power during the under-generation condition. It should be appreciated that the foregoing example control strategies may be combined. That is, instead of basing the control strategy either on pure time delays or a slow ramping, one could utilize a hybrid approach where one uses a time delay and a slow ramp to reduce or avoid negative effects on frequency regulation. In one example embodiment, the control strategy may comprise at least a first segment where the output power transitions at a first rate of change and may further comprise at least a second segment where the output power is delayed by a predefined time delay.

Aspects of the present invention recognize that variable speed wind turbines, as described in the context of FIG. 1, have some ability to smooth variations in wind power by storing or releasing energy by adjusting shaft speed, known as a flywheel effect. For example, if a wind turbine is operating below rated power and the wind speed increases, the shaft could absorb additional energy without increasing output power if the system frequency were high. Or, alternately, the turbine could slowly ramp the power output to the higher level. It will be appreciated that, during certain operational conditions, such as when ramping down Pact at a rate slower than Pavail, the wind turbine shaft could be driven to a minimum speed. Thus, during such operational conditions, it may be desirable to adjust the ramping down rate to a relatively faster rate at least for a certain period of time.

As will be also appreciated, the above described techniques may take the form of computer or processor implemented processes and apparatuses for practicing those processes. Aspects of the present technique may also be embodied in the form of computer program code containing instructions embodied in tangible media, such as CD-ROMs, hard drives, or any other computer-readable storage medium, wherein, when the computer program code is loaded into and executed by a computer or processor, the computer becomes an apparatus for practicing the invention. The techniques described may further be embodied in the form of computer program code or signal, for example, whether stored in a storage medium, loaded into and/or executed by a computer or processor, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind farm comprising:
a plurality of variable speed wind turbines; and
a centralized controller configured to selectively adjust a respective electrical output power from each of the wind turbines, wherein the controller includes a monitor configured to monitor over one or more periods of time a directional correlation between values corresponding to a deviation from a grid frequency and a wind power change, the controller configured to adjust a response of the electrical output power over the one or more periods of time for at least one of the wind turbines based on the monitored correlation between the values corresponding to the grid frequency deviation and the wind power change, the response of the electrical output power configured to meet a grid frequency regulation notwithstanding of random occurrences of wind power changes.

2. The wind farm of claim 1, wherein when the monitored directional correlation indicates over a respective period of time a positive correlation between values corresponding to a deviation from the grid frequency and a wind power change, then the output power response is adjusted over said respective period of time in accordance with a first control strategy.

3. The wind farm of claim 2, wherein when the monitored directional correlation indicates over a further period of time a negative correlation between values corresponding to a deviation from the grid frequency and a wind power change, then the output power response is adjusted over said further period of time in accordance with a second control strategy.

4. The wind farm of claim 3, wherein the first control strategy comprises a transition for the output power at a first rate of change, and wherein the second control strategy comprises a transition for the output power at a second rate of change, wherein the second rate change is higher than the first rate of change.

5. The wind farm of claim 4, wherein said first rate of change comprises ramping up or ramping down the electrical power output at a rate of 50% or less per minute with respect to a rated output power of the wind turbine.

6. The wind farm of claim 4, wherein said second rate of change comprises transitioning the output power at an average rate of 1% or more per second with respect to a rated output power of the wind turbine.

7. The wind farm of claim 2, wherein the first control strategy comprises a delayed transition for the output power.

8. The wind farm of claim 2, wherein the first control strategy comprises at least a transition segment where the output power transitions at a first rate of change and further comprises at least a delay segment where the output power is delayed by a predefined time delay.

9. The wind farm of claim 1, comprising a wind turbine implementation selected from the group consisting of a doubly-fed induction generator implementation, a direct-drive implementation, and a geared full-converter implementation.

10. A variable speed wind turbine comprising:
a controller configured to adjust an electrical output power from the wind turbine, wherein the controller includes a monitor configured to monitor over one or more periods of time a directional correlation between values corresponding to a deviation from a grid frequency and a wind power change, the controller configured to adjust a response of the electrical output power over the one or more periods of time based on the monitored directional correlation between the values corresponding to the deviation from the grid frequency and the wind power change, the response of the electrical output power configured to meet a grid frequency regulation notwithstanding of random occurrences of wind power changes.

11. The wind turbine of claim 10, wherein when the monitored directional correlation indicates over a respective period of time a positive correlation between values corresponding to a deviation from the grid frequency and a wind power change, then the output power response is adjusted over said respective period of time in accordance with a first control strategy.

12. The wind turbine of claim 11, wherein when the monitored directional correlation indicates over a further period of time a negative correlation between values corresponding to a deviation from the grid frequency and a wind power change, then the output power response is adjusted over said further period of time in accordance with a second control strategy.

13. The wind turbine of claim 12, wherein the first control strategy comprises a transition for the output power at a first rate of change, and wherein the second control strategy comprises a transition for the output power at a second rate of change, wherein the second rate change is higher than the first rate of change.

14. The wind turbine of claim 13, wherein said first rate of change comprises ramping up or ramping down the electrical power output at a rate of 50% or less per minute with respect to a rated output power of the wind turbine.

15. The wind turbine of claim 13, wherein said second rate of change comprises transitioning the output power at an average rate of 1% or more per second with respect to a rated output power of the wind turbine.

16. The wind turbine of claim 11, wherein the first control strategy comprises a delayed transition for the output power.

17. The wind turbine of claim 11, wherein the first control strategy comprises at least a transition segment where the output power transitions at a first rate of change and further comprises at least a delay segment where the output power is delayed by a predefined time delay.

18. The wind turbine of claim 10, comprising a wind turbine implementation selected from the group consisting of a doubly-fed induction generator implementation, a direct-drive implementation, and a geared full-converter implementation.

19. A method for controlling a variable speed wind turbine comprising:
adjusting an electrical output power from the wind turbine;
monitoring over one or more periods of time a directional correlation between values corresponding to a deviation from a grid frequency and a wind power change; and
adjusting a response of the electrical output power over the one or more periods of time based on the monitored directional correlation between the values corresponding to the deviation from the grid frequency and the wind power change, wherein the response of the electrical output power is configured to meet a grid frequency regulation notwithstanding of random occurrences of wind power changes.

20. The method of claim 19, wherein when the monitored directional correlation indicates over a respective period of time a positive correlation between values corresponding to a deviation from the grid frequency and a wind power change, adjusting the output power response over said respective period of time in accordance with a first control strategy.

21. The method of claim 20, wherein when the monitored directional correlation indicates over a further period of time a negative correlation between values corresponding to a deviation from the grid frequency and a wind power change, adjusting the output power response over said further period of time in accordance with a second control strategy.

22. The method of claim 21, wherein the first control strategy comprises transitioning the output power at a first rate of change, and wherein the second control strategy comprises transitioning the output power at a second rate of change, wherein the second rate change is higher relative to the first rate of change.

23. The method of claim 22, wherein said first rate of change comprises ramping up or ramping down the output power at a rate of 50% or less per minute with respect to a rated output power of the wind turbine.

24. The method of claim 22, wherein said second rate of change comprises transitioning the output power at an average rate of 1% or more per second with respect to a rated output power of the wind turbine.

25. The method of claim 20, wherein the first control strategy comprises delaying a transition of the output power.

26. The method of claim 20, wherein the first control strategy comprises transitioning during a transition segment the output power at a first rate of change and further comprises delaying during a delay segment the output power by a predefined time delay.

* * * * *